2,814,640

PROCESS FOR PREPARING CYCLOHEXYL SULFAMIC ACID

David R. V. Golding, Wilmington, Del., assignor to E. I. du Pont de Nemours and Company, Wilmington, Del., a corporation of Delaware No Drawing. Application August 12, 1954, Serial No. 449,501

4 Claims. (Cl. 260—501)

This invention relates to the preparation of cyclohexylsulfamates and is more particularly directed to the preparation of tertiary amine cyclohexylsulfamates by heating a mixture of a tertiary amine, cyclohexylamine, and sulfamic acid or ammonium sulfamate.

While cyclohexylsulfamates have heretofore been prepared by the reaction of cyclohexylamine and sulfamic acid, I have found that a more rapid reaction can be effected by bringing together a tertiary amine, cyclohexylamine, and sulfamic acid or ammonium sulfamate.

When the reactants are brought together, the tertiary amine at once combines with sulfamic acid or, following loss of ammonia, with ammonium sulfamate. The reaction that may then be visualized is as follows:

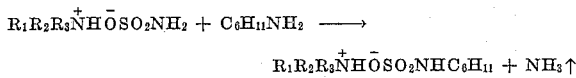

$$R_1R_2R_3\overset{+}{N}H\overset{-}{O}SO_2NH_2 + C_6H_{11}NH_2 \longrightarrow$$

$$R_1R_2R_3\overset{+}{N}H\overset{-}{O}SO_2NHC_6H_{11} + NH_3\uparrow$$

In the above the symbols $R_1$, $R_2$, and $R_3$ represent the substituents on the tertiary amine.

The tertiary amines used according to the invention can accordingly be represented as follows:

$$R_1—\underset{\underset{R_3}{|}}{\overset{\overset{R_2}{|}}{N}}—R_3$$

The three substituents are saturated aliphatic hydrocarbon groups which have no more than 18 carbon atoms.

As examples of tertiary amines which can be used, there can be named trimethylamine, triethylamine, tri-n-propylamine, tri-n-butylamine, N,N - diethylbutylamine, N,N-dimethyloctylamine, N,N-dimethyllaurylamine, and N,N-dimethyloctadecylamine.

The preferred amines are those of which the amine salts are completely or partially soluble. This can be determined qualitatively, for example, by heating a small amount of amine and sulfamic acid together to determine their mutual solubility. If two phases form, the relative amounts can be measured, and if there is as much solubility as, say, 10%, the system will operate quite effectively. The greater the solubility, the better.

It is to be noted that tertiary amines are preferred in which the saturated aliphatic groups include two aliphatic groups having no more than 3 carbon atoms, the remaining group having a relatively larger number of carbon atoms, say from 4 to no more than 18.

It is preferred, though not necessary, to choose an amine with physical properties which make the processing steps simple. Trimethylamine and triethylamine have such low boiling points that the reaction must be conducted under pressure. If, on the other hand, the boiling point of the amine is as high or higher than the reaction temperature, then the reaction can be carried out at atmospheric pressure. If the amine is insoluble or only slightly soluble in water, then the greater part of the separation of reactants and products can be affected by simple extraction and decantation. Lauryldimethylamine is a preferred amine for these reasons.

The tertiary amine, as described, is added to cyclohexylamine and a sulfamic acid compound selected from the group consisting of sulfamic acid and ammonium sulfamate. If ammonium sulfamate is used, it will soon lose ammonia and will act, for purposes of the present reaction, much like sulfamic acid.

The proportions of cyclohexylamine and the sulfamic acid compound are not critical. It is preferred that at least a slight excess of cyclohexylamine be used over that equivalent to the sulfamic acid or ammonium sulfamate. Considerable excess up to say 50% or even more can be used without disadvantage other than the problem of recovering the excess cyclohexylamine.

The ratio, by weight, of the tertiary amine to the sulfamic acid compound is chosen for operating convenience. Broadly the mol ratio of tertiary amine:sulfamic acid will range from 1:1 to 25:1. Ordinarily, the preferred limits vary between about 3:1 and 10:1.

The reactants can be mixed in any way. For example, the three can simply be brought together in a reaction vessel. If preferred, the tertiary amine and the sulfamic acid compound can first be added and the cyclohexylamine can be added last. Again, the two amines can be added first.

The temperature and pressure of reaction will depend upon the particular tertiary amine used. Generally, the temperature selected should be high enough to give a convenient rate of reaction without undue side reactions. Pressure is, of course, dependent upon the vapor pressure of the reaction mass at the temperature chosen. It is preferred also to remove ammonia as it forms.

Generally, a temperature will be used within the range of about 75° to 200° C. More narrowly a temperature from 120° to 175° C. will be used.

After the reaction is complete and the tertiary amine salt of cyclohexylsulfamic acid has been formed, the product can be isolated in any desired manner. Unreacted amines can be separated by distillation and the product can be purified in conventional manners as by recrystallization from a solvent.

Instead of trying to obtain the tertiary amine salt in pure form, it can advantageously be converted to the sodium, calcium, or other such salt of cyclohexylamine salt in water with at least equivalent amount of the appropriate hydroxide. This can be done, generally, in the same ways that cyclohexylammonium cyclohexylsulfamate has heretofore been converted to the metal salt of cyclohexylsulfamic acid.

In order that the invention may be better understood, reference should be had to the following illustrative example.

Example

N,N-dimethyllaurylamine, sulfamic acid, and 1.12 equivalents of cyclohexylamine based on the sulfamic acid were mixed at room temperature in a reaction vessel which was provided with a stirrer. The mol ratio N,N-dimethyllaurylamine:sulfamic acid was 6.2:1.

The mixture was heated to a temperature of 145° C. The reaction rate was followed by titrating the basic gas evolved with HCl to bromophenol blue. The reaction was 50 percent complete after 50 minutes and was 91 percent complete after 2 hours.

The product was treated with dilute, 8 percent NaOH, in amount equivalent to the cyclohexysulfamic acid and the sodium cyclohexylsulfamate was present in an aqueous layer. This was separated from the amines by decanting. Amines soluble on the aqueous layer were removed azeotropically by distillation of the aqueous solution. The remaining aqueous solution contained sodium cyclohexylsulfamate together with a small amount of sodium sulfamate.

The calcium salt was prepared in similar manner using calcium hydroxide instead of sodium hydroxide.

I claim:

1. In a process for making cyclohexyl sulfamate wherein cyclohexylamine is reacted with a sulfamic acid compound selected from the group consisting of sulfamic acid and ammonium sulfamate, the step comprising adding a tertiary amine in which the nitrogen substituents are saturated aliphatic hydrocarbon groups two of which have no more than 3 carbon atoms, and the one remaining having from 4 to 18 carbon atoms, to the reactants and heating the mixture.

2. In a process for making cyclohexyl sulfamate wherein cyclohexylamine is reacted with a sulfamic acid compound selected from the group consisting of sulfamic acid and ammonium sulfamate, the step comprising adding lauryl dimethylamine to the reactants and heating the mixture to a temperature between 75° and 200° C.

3. In a process for making cyclohexylsulfamate wherein cyclohexylamine is reacted with a sulfamic acid compound selected from the group consisting of sulfamic acid and ammonium sulfamate, the step comprising adding lauryl dimethylamine to the reactants and heating the mixture to a temperature between 75° and 200° C., the ratio of the lauryl dimethylamine to sulfamic acid compound being 1:1 to 25:1 and the amount of cyclohexylamine being at least that equivalent to the sulfamic acid compound.

4. In a process for making cyclohexylsulfamate wherein cyclohexylamine is reacted with a sulfamic acid compound selected from the group consisting of sulfamic acid and ammonium sulfamate, the step comprising adding lauryl dimethylamine to the reactants and heating the mixture to a temperature between 120° and 175° C. the ratio of the lauryl dimethylamine to sulfamic acid compound being 3:1 to 10:1 and the amount of the cyclohexylamine being at least that equivalent to the sulfamic acid compound.

References Cited in the file of this patent

UNITED STATES PATENTS

| | | |
|---|---|---|
| 2,275,125 | Audrieth et al. | Mar. 3, 1942 |

FOREIGN PATENTS

| | | |
|---|---|---|
| 662,800 | Great Britain | Dec. 12, 1951 |
| 669,200 | Great Britain | Mar. 26, 1952 |